US010673745B2

(12) United States Patent
Swarbrick et al.

(10) Patent No.: US 10,673,745 B2
(45) Date of Patent: Jun. 2, 2020

(54) END-TO-END QUALITY-OF-SERVICE IN A NETWORK-ON-CHIP

(71) Applicant: Xilinx, Inc., San Jose, CA (US)

(72) Inventors: Ian A. Swarbrick, Santa Clara, CA (US); Ygal Arbel, Morgan Hill, CA (US); Millind Mittal, Saratoga, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/886,583

(22) Filed: Feb. 1, 2018

(65) Prior Publication Data

US 2019/0238453 A1    Aug. 1, 2019

(51) Int. Cl.
| | |
|---|---|
| *H04L 12/725* | (2013.01) |
| *H04L 12/851* | (2013.01) |
| *G06F 15/78* | (2006.01) |
| *H04L 12/931* | (2013.01) |
| *H04L 29/08* | (2006.01) |
| *H04W 4/50* | (2018.01) |
| *H04L 12/933* | (2013.01) |
| *H04L 12/701* | (2013.01) |
| *H04L 12/70* | (2013.01) |
| *H04L 12/863* | (2013.01) |
| *H04L 12/721* | (2013.01) |

(52) U.S. Cl.
CPC .......... *H04L 45/302* (2013.01); *G06F 15/781* (2013.01); *G06F 15/7825* (2013.01); *H04L 45/00* (2013.01); *H04L 47/24* (2013.01); *H04L 49/109* (2013.01); *H04L 49/205* (2013.01); *H04L 67/34* (2013.01); *H04W 4/50* (2018.02); *H04L 45/38* (2013.01); *H04L 47/6215* (2013.01); *H04L 2012/5651* (2013.01)

(58) Field of Classification Search
CPC ..... H04L 45/302; H04L 47/24; H04L 49/205; H04L 47/6215; H04L 2012/5651; G06F 15/781
See application file for complete search history.

(56) References Cited

U.S. PATENT DOCUMENTS

| | | |
|---|---|---|
| 7,769,027 B2 | 8/2010 | Douady et al. |
| 8,316,171 B2 | 11/2012 | Boucard et al. |
| 9,007,920 B2 | 4/2015 | Kumar et al. |
| 9,473,415 B2 | 10/2016 | Kumar |
| 9,495,290 B2 | 11/2016 | Wingard et al. |

(Continued)

OTHER PUBLICATIONS

Weber, Wolf-Dietrich et al., "A Quality-of-Service Mechanism for Interconnection Networks in a System-on-Chips," Proc. of the 2005 Conference on Design, Automation and Test in Europe, Mar. 7, 2005, pp. 1232-1237, vol. 2, IEEE Computer Society Washington, DC, USA.

*Primary Examiner* — Kashif Siddiqui
(74) *Attorney, Agent, or Firm* — Patterson + Sheridan, LLP

(57) ABSTRACT

An example method of generating a configuration for a network on chip (NoC) in a programmable device includes: receiving traffic flow requirements for a plurality of traffic flows; assigning routes through the NoC for each traffic flow based on the traffic flow requirements; determining arbitration settings for the traffic flows along the assigned routes; generating programming data for the NoC; and loading the programming data to the programmable device to configure the NoC.

20 Claims, 9 Drawing Sheets

(56) References Cited

U.S. PATENT DOCUMENTS

| | | | |
|---|---|---|---|
| 9,529,400 B1* | 12/2016 | Kumar | G06F 1/26 |
| 9,571,341 B1* | 2/2017 | Kumar | H04L 47/125 |
| 9,769,077 B2 | 9/2017 | Kumar | |
| 2004/0114609 A1 | 6/2004 | Swarbrick et al. | |
| 2004/0210695 A1 | 10/2004 | Weber et al. | |
| 2008/0320255 A1 | 12/2008 | Wingard et al. | |
| 2008/0320268 A1 | 12/2008 | Wingard et al. | |
| 2012/0036296 A1 | 2/2012 | Wingard et al. | |
| 2015/0036536 A1* | 2/2015 | Kumar | H04L 41/12 370/254 |
| 2015/0117261 A1 | 4/2015 | Kumar | |
| 2017/0063625 A1* | 3/2017 | Philip | H04L 41/0889 |
| 2017/0140800 A1 | 5/2017 | Wingard et al. | |
| 2017/0264533 A1 | 9/2017 | Chopra et al. | |

\* cited by examiner

END-TO-END QUALITY-OF-SERVICE IN A NETWORK-ON-CHIP

TECHNICAL FIELD

Examples of the present disclosure generally relate to electronic circuits and, in particular, to end-to-end quality-of-service in a network-on-chip.

BACKGROUND

Bus structures have been found to be unsuitable for some system on chip (SoC) integrated circuits (SoCs). With increases in circuit integration, transactions can become blocked and increased capacitance can create signaling problems. In place of a bus structure, a network on chip (NoC) can be used to support data communications between components of the SoC.

A NoC generally includes a collection of switches that route packets from source circuits ("sources") on the chip to destination circuits ("destinations") on the chip. The layout of the switches in the chip supports packet transmission from the desired sources to the desired destinations. A packet may traverse multiple switches in transmission from a source to a destination. Each switch can be connected to one or more other switches in the network and routes an input packet to one of the connected switches or to the destination.

SUMMARY

Techniques for end-to-end quality-of-service in a network-on-chip. In an example, a method of generating a configuration for a network on chip (NoC) in a programmable device includes: receiving traffic flow requirements for a plurality of traffic flows; assigning routes through the NoC for each traffic flow based on the traffic flow requirements; determining arbitration settings for the traffic flows along the assigned routes; generating programming data for the NoC; and loading the programming data to the programmable device to configure the NoC.

In another example, a non-transitory computer readable medium having stored thereon instructions executable by a processor to perform a method of generating a configuration for a network on chip (NoC) in a programmable device includes: receiving traffic flow requirements for a plurality of traffic flows; assigning routes through the NoC for each traffic flow based on the traffic flow requirements; determining arbitration settings for the traffic flows along the assigned routes; generating programming data for the NoC; and loading the programming data to the programmable device to configure the NoC.

In another example, an integrated circuit include: a processing system; a programmable logic region; and a network on chip (NoC) coupling the processing system and the programmable logic region, the NoC including master circuits coupled to slave circuits through one or more physical channels, a first physical channel having a plurality of virtual channels.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
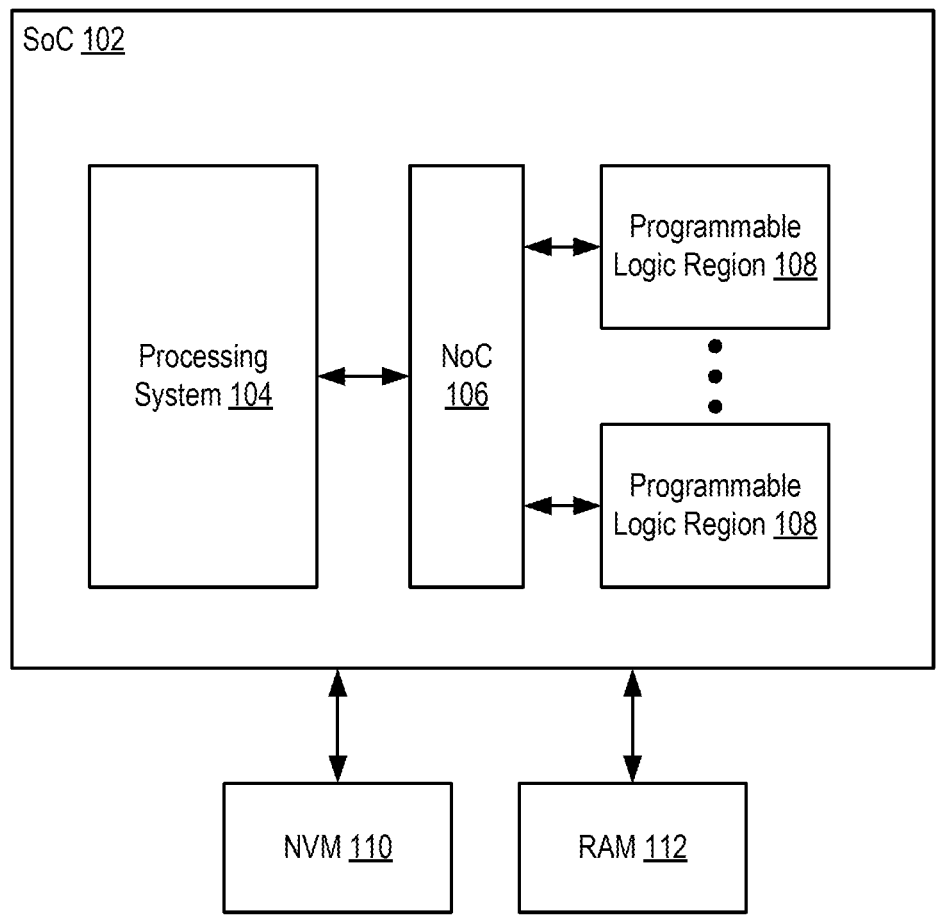
FIG. 1 is a block diagram depicting a system-on-chip (SoC) according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a system-on-chip (SoC) 102 according to an example. The SoC 102 is an integrated circuit (IC) comprising a processing system 104, a network-on-chip (NoC) 106, and one or more programmable regions 108. The SoC 102 can be coupled to external circuits, such as a nonvolatile memory (NVM) 110 and/or random access memory (RAM) 112. The NVM 110 can store data that can be loaded to the SoC 102 for configuring the SoC 102, such as configuring the NoC 106 and the programmable logic region(s) 108. Examples of the processing system 104 and the programmable logic region(s) 108 are described below. In general, the processing system 104 is connected to the programmable logic region(s) 108 through the NoC 106.

The NoC 106 includes end-to-end Quality-of-Service (QoS) features for controlling data-flows therein. In examples, the NoC 106 first separates data-flows into designated traffic classes. Data-flows in the same traffic class can either share or have independent virtual or physical transmission paths. The QoS scheme applies two levels of priority across traffic classes. Within and across traffic classes, the NoC 106 applies a weighted arbitration scheme to shape the traffic flows and provide bandwidth and latency that meets the user requirements. Examples of the NoC 106 are discussed further below.

Figure 2:
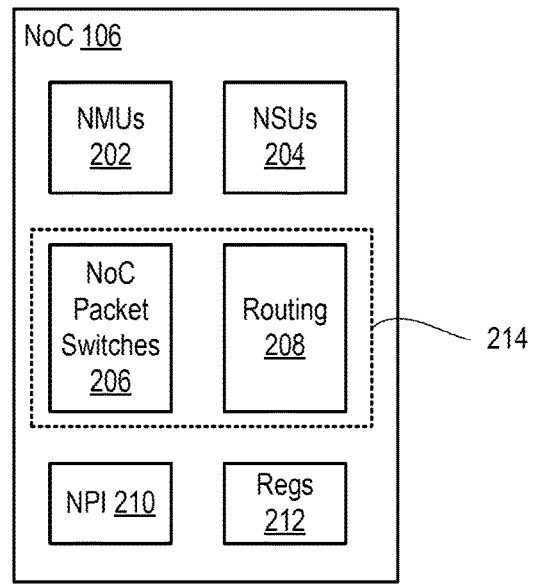
FIG. 2 is a block diagram depicting a network on chip (NoC) according to an example.

FIG. 2 is a block diagram depicting the NoC 106 according to an example. The NoC 106 includes NoC master units (NMUs) 202, NoC slave units (NSUs) 204, a network 214, NoC peripheral interconnect (NPI) 210, and registers (Regs) 212. Each NMU 202 is an ingress circuit that connects a master endpoint to the NoC 106. Each NSU 204 is an egress circuit that connects the NoC 106 to a slave endpoint. The NMUs 202 are connected to the NSUs 204 through the network 214. In an example, the network 214 includes NoC packet switches 206 and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include registers 212 that determine functionality thereof. The NPI 210 includes interconnect coupled to the registers 212 for programming thereof to set functionality. Configuration data for the NoC 106 can be stored in the NVM 110 and provided to the NPI 210 for programming the NoC 106.

Figure 3:
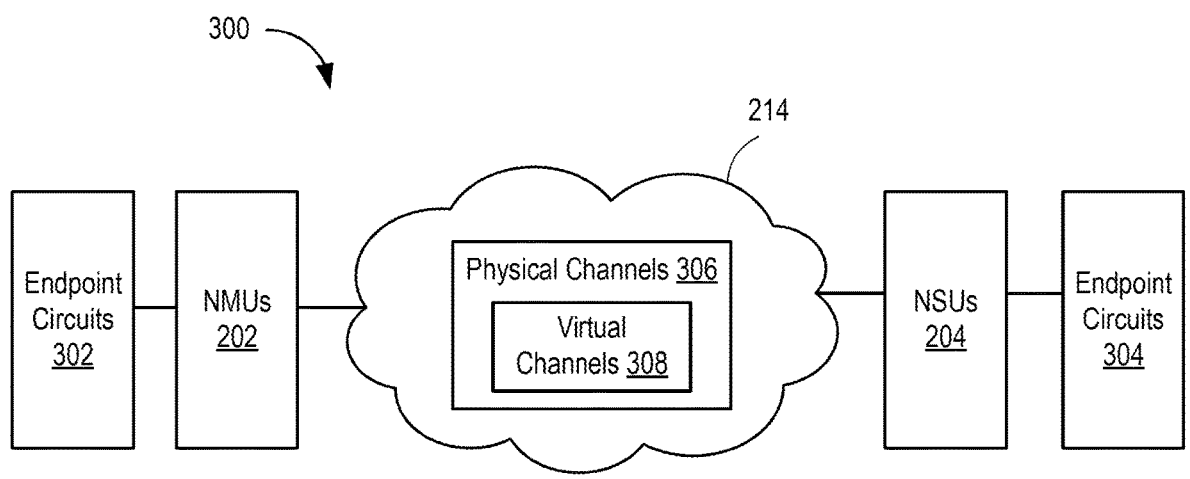
FIG. 3 is a block diagram depicting connections between endpoint circuits through a NoC according to an example.

FIG. 3 is a block diagram depicting connections between endpoint circuits through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104 or a circuit in a programmable logic region 108. Each endpoint circuit in the programmable logic region 108 can be a dedicated circuit (e.g., a hardened circuit) or a circuit configured in programmable logic.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Figure 4:
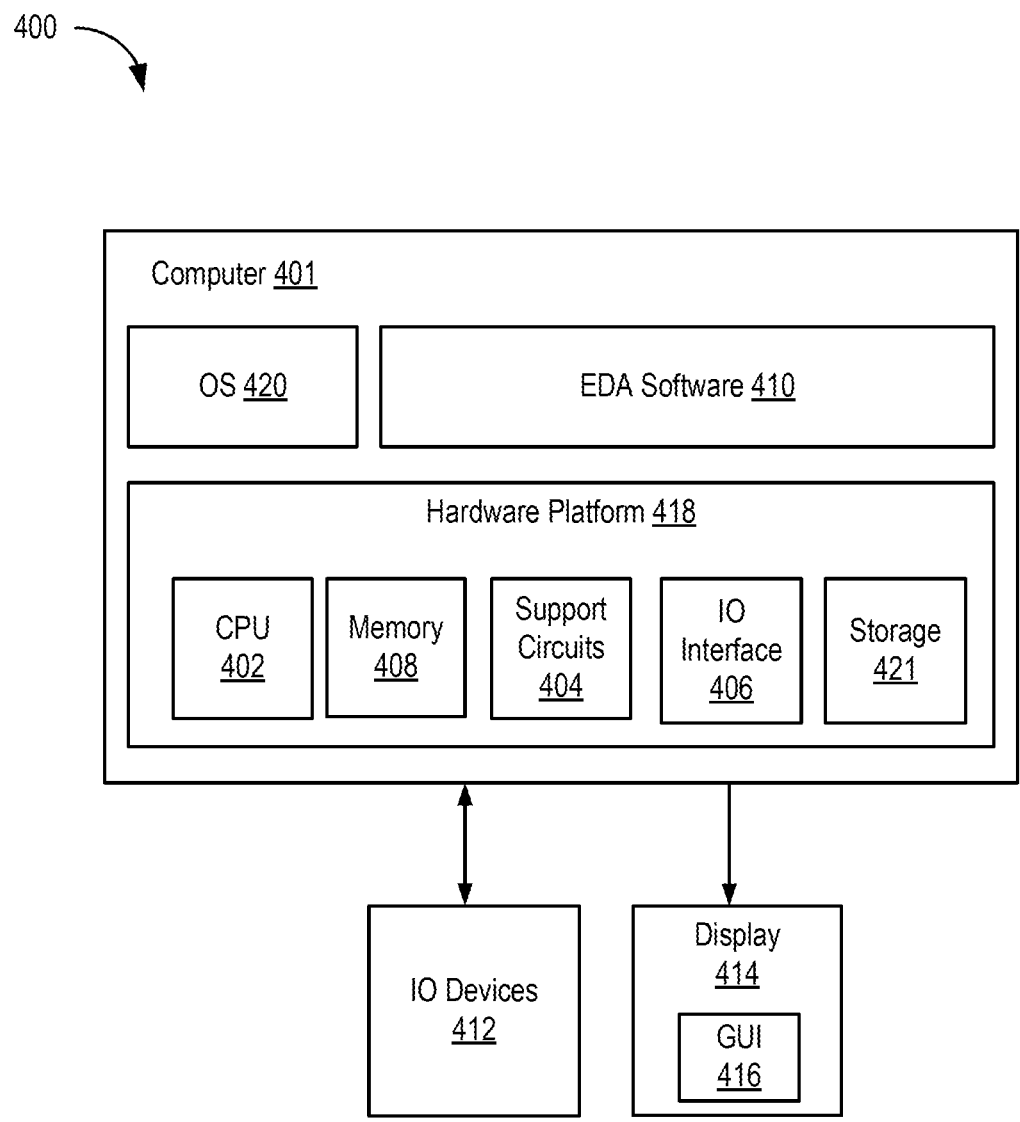
FIG. 4 is a block diagram depicting a computer system according to an example.

FIG. 4 is a block diagram depicting a computer system 400 according to an example. The computer system 400 includes a computer 401, input/output (IO) devices 412, and a display 414. The computer 401 includes a hardware platform 418 and software executing on the hardware platform 418, including operating system (OS) 420 and electronic design automation (EDA) software 410. The hardware platform 418 includes a central processing unit (CPU) 402, system memory 408, storage devices ("storage 421"), support circuits 404, and an IO interface 406.

The CPU 402 can be any type of general-purpose central processing unit (CPU), such as an x86-based processor, ARM®-based processor, or the like. The CPU 402 can include one or more cores and associated circuitry (e.g., cache memories, memory management units (MMUs), interrupt controllers, etc.). The CPU 402 is configured to execute program code that perform one or more operations described herein and which can be stored in the system memory 408 and/or the storage 421. The support circuits 404 include various devices that cooperate with the CPU 402 to manage data flow between the CPU 402, the system memory 408, the storage 421, the IO interface 406, or any other peripheral device. For example, the support circuits 404 can include a chipset (e.g., a north bridge, south bridge, platform host controller, etc.), voltage regulators, firmware (e.g., a BIOS), and the like. In some examples, the CPU 402 can be a System-in-Package (SiP), System-on-Chip (SoC), or the like, which absorbs all or a substantial portion of the functionality of the support circuits 404 (e.g., north bridge, south bridge, etc.).

The system memory 408 is a device allowing information, such as executable instructions and data, to be stored and retrieved. The system memory 408 can include, for example, one or more random access memory (RAM) modules, such as double-data rate (DDR) dynamic RAM (DRAM). The storage 421 includes local storage devices (e.g., one or more hard disks, flash memory modules, solid state disks, and optical disks) and/or a storage interface that enables the computer 401 to communicate with one or more network data storage systems. The IO interface 406 can be coupled to the IO devices 412 and the display 414.

The OS 420 can be any commodity operating system known in the art, such as such as Linux®, Microsoft Windows®, Mac OS®, or the like. A user can interact with the EDA software 410 to generate configuration data for the SoC 102. In particular, the EDA software 410 is configured to generate configuration data for programming the NoC 106 to implement various physical and virtual channels for connecting endpoint circuits.

Figure 5:
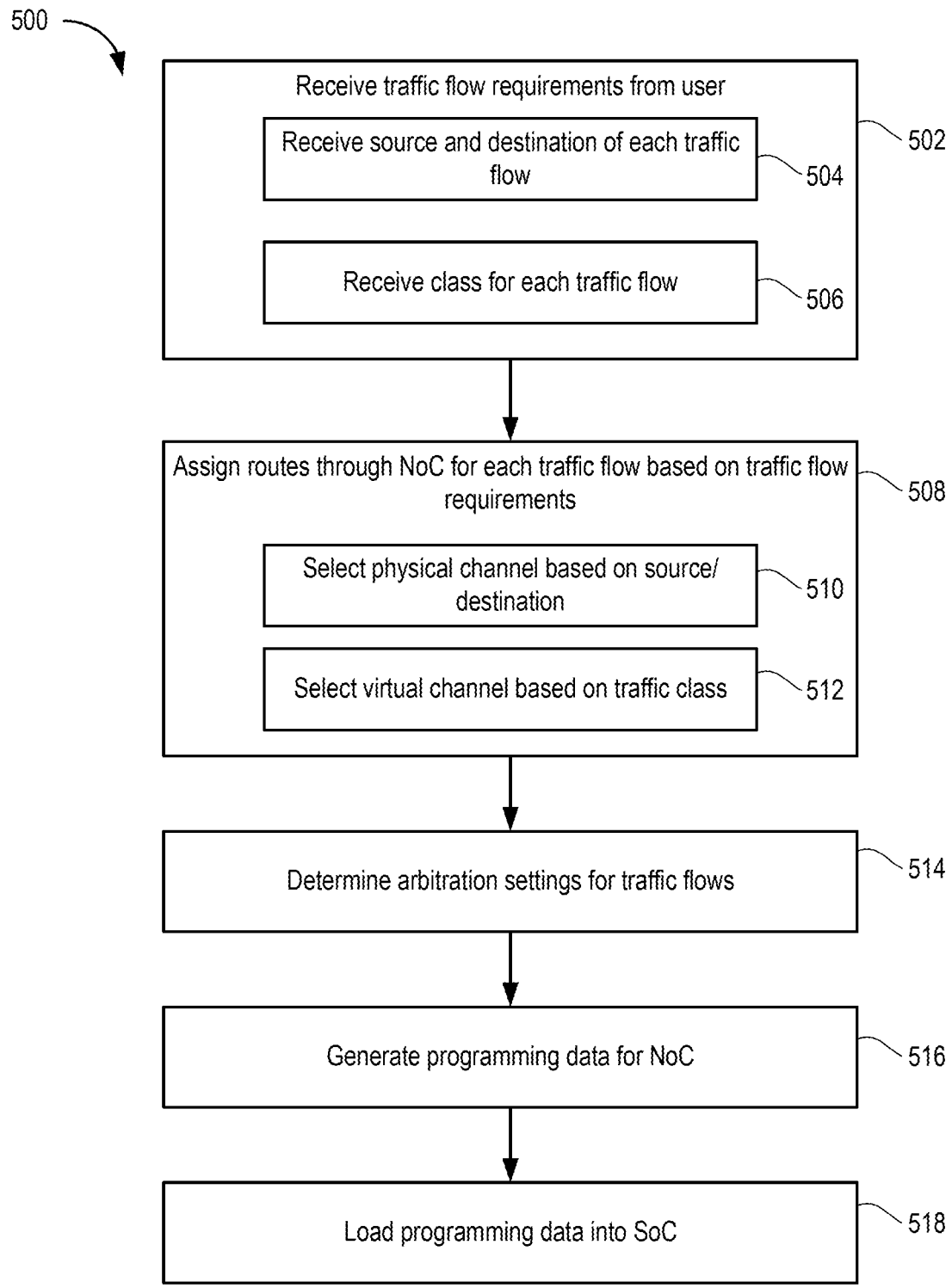
FIG. 5 is a flow diagram depicting a method of generating configuration data for a NoC according to an example.

FIG. 5 is a flow diagram depicting a method 500 of generating configuration data for the NoC 106 according to an example. The method 500 can be performed by the EDA software 410. The method 500 begins at step 502, where the EDA software 410 receives traffic flow requirements from the user. In an example, at step 504, the EDA software 410 receives source and destination information for each traffic flow specified by the user (e.g., a source endpoint and a destination endpoint for each traffic flow). A traffic flow is a connection that conveys data ("traffic") between endpoints. At step 506, the EDA software 410 receives class information for each traffic flow specified by the user. Example traffic classes include low-latency traffic, isochronous traffic, best-effort (BE) traffic (e.g., bandwidth guaranteed traffic), and the like.

At step 508, the EDA software 410 assigns routes through the NoC 106 for each traffic flow based on the traffic flow requirements. In an example, at step 510, the EDA software 410 selects a physical channel for each traffic flow based on source and destination thereof. The NoC 106 can have multiple physical routes available between each source and destination. At step 512, the EDA software 410 selects a virtual channel for one or more virtual channels based on traffic class thereof. That is, a given physical channel can have a plurality of virtual channels and can convey a plurality of traffic flows that are separated by traffic class. Each virtual channel within a physical channel carries only one traffic class, but several traffic flows within the same traffic class For example, a given physical channel can convey a traffic flow in the low-latency traffic class and another traffic flow in the isochronous traffic class in a pair of virtual channels. Note that steps 510 and 512 can occur concurrently in the method 500.

At step 514, the EDA software 410 determines arbitration settings for the traffic flows specified by the user. In an example, the EDA software 410 sets virtual channels having higher priority traffic to have higher priority through the switches 206 and virtual channels having lower priority traffic to have lower priority through the switches 206. For example, isochronous or low-latency traffic can have a higher priority than other traffic types. In an example, arbitration uses a deficit scheme. At each arbiter output (e.g., output of a switch 206), there is a combined arbitration for all virtual channels from all input ports to one output port. Each virtual channel from each input port has an independent weight value that provides a specified number of arbitration tokens. The tokens are used to shape the arbitration and control the bandwidth assignment across trafficflows. This scheme ensures that all requestors (e.g., endpoints) that have tokens are serviced before the tokens are refreshed/reloaded. This ensures that the arbitration does not cause starvation, since all requests in one group must be serviced before a new group can start. Arbitration settings determined at step 514 can be programmed at boot time or can be adjusted dynamically during operation.

At step 516, the EDA software 410 generates programming data for the NoC 106. The programming data is set to configure the NoC 106 to implement the physical channels, virtual channels, and optionally the arbitration settings. In some examples, the arbitration settings can be programmed dynamically after configuration of the NoC 106. At step 518, the EDA software 410 loads the programming data to the SoC 102 (e.g., by storing the programming data in the NVM 110 or directly providing the programming data to the SoC 102).

The method 500 provides fully programmable, end-to-end QoS using the NoC 106. Some SoCs have a relatively fixed interconnect with limited flexibility in arbitration schemes. Other SoCs have selectable routes and limited QoS prioritization, but do not have separate traffic classes and precise bandwidth allocation across traffic flows. The method 500 provides for a combination of virtual channels for independent flow control, configurable physical channel routing, deficit arbitration in groups, and assignment of traffic classes.

Figure 6:
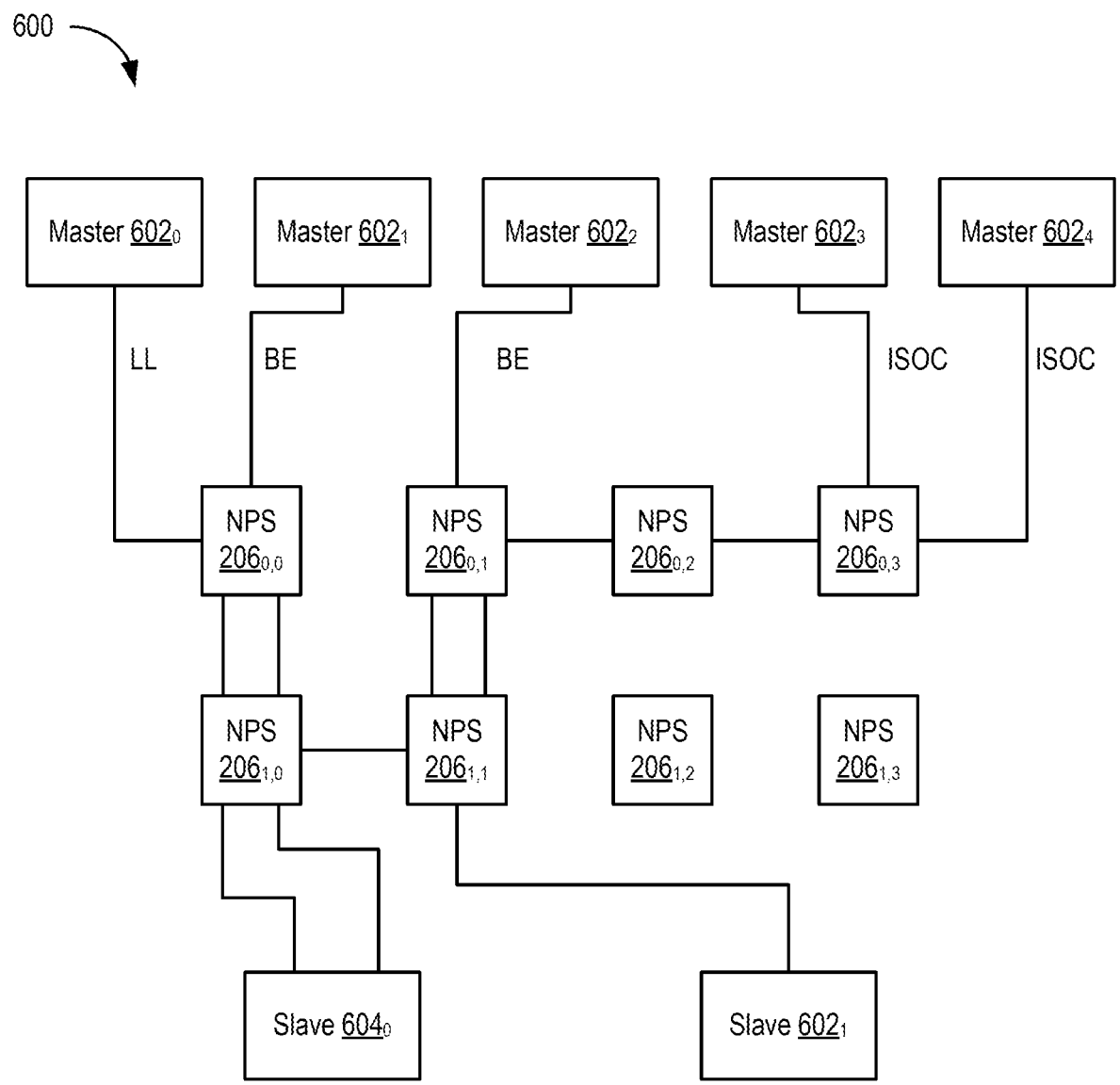
FIG. 6 is a block diagram depicting a communication system according to an example.

FIG. 6 is a block diagram depicting a communication system 600 according to an example. The communication system 600 includes master devices $602_0 \ldots 602_4$ (master devices 602) coupled to slave devices $604_0$ and $604_1$ (slave devices 604) through the NoC 106. The master devices 602 and slave devices 604 comprise endpoint circuits in the SoC 102 coupled to NMUs 202 and NSUs 204, respectively. The NoC 106 includes NoC packet switches (NPS) 206 (e.g., NPS $206_{0,0} \ldots 206_{0,3}$ and NPS $206_{1,0} \ldots 206_{1,3}$).

The master device $602_0$ and the master device $602_1$ are coupled to the NPS $206_{0,0}$. The master device $602_0$ is coupled to the NPS $206_{0,0}$ through a low-latency (LL) virtual channel. The master device $602_1$ is coupled to the NPS $206_{0,0}$ through a best-effort (BE) virtual channel. The master device $602_3$ is coupled to the NPS $206_{0,1}$ through a BE virtual channel. The master device $602_3$ is coupled to the NPS $206_{0,3}$ through an isochronous (ISOC) virtual channel. The master $602_4$ is coupled to the NPS $206_{0,3}$ through an ISOC virtual channel. The NPS $206_{0,1}$ is coupled to the NPS $206_{0,2}$. The NPS $206_{0,2}$ is coupled to the NPS $206_{0,3}$.

The NPS $206_{0,0}$ is coupled to the NPS $206_{1,0}$. The NPS $206_{0,1}$ is coupled to the NPS $206_{1,1}$. The NPS $206_{1,2}$ and the NPS $206_{1,3}$ are unconnected and not used in the current configuration of the communication system 600. The NPS $206_{1,0}$ is coupled to the slave $604_0$. The NPS $206_{1,1}$ is coupled to the slave $602_1$. The NPS $206_{1,0}$ is coupled to the NPS $206_{1,1}$.

In operation, the master device $602_0$ sends traffic that is low-latency to the slave device $604_0$. Masters $602_1$ and $602_2$ both send best-effort traffic to the slave device $604_0$. Masters $602_3$ and $602_4$ send isochronous traffic to the slave device $604_1$. Each traffic flow enters each switch on a separate physical channel. There are two virtual channels (designated by a pair of lines) between NPS $206_{0,0}$ and NPS $206_{1,0}$, between NPS $206_{0,1}$ and NPS $206_{1,1}$, and between NPS $206_{1,0}$ and slave device $604_0$. Other paths use only a single virtual channel on the physical channel (e.g., between NPS $206_{0,1}$ and NPS $206_{0,2}$ and between NPS $206_{1,1}$ and the slave device $602_1$). Each NPS 206 has output port arbitration that controls the mixing of traffic from input ports to the output port, as described further below.

Figure 7:
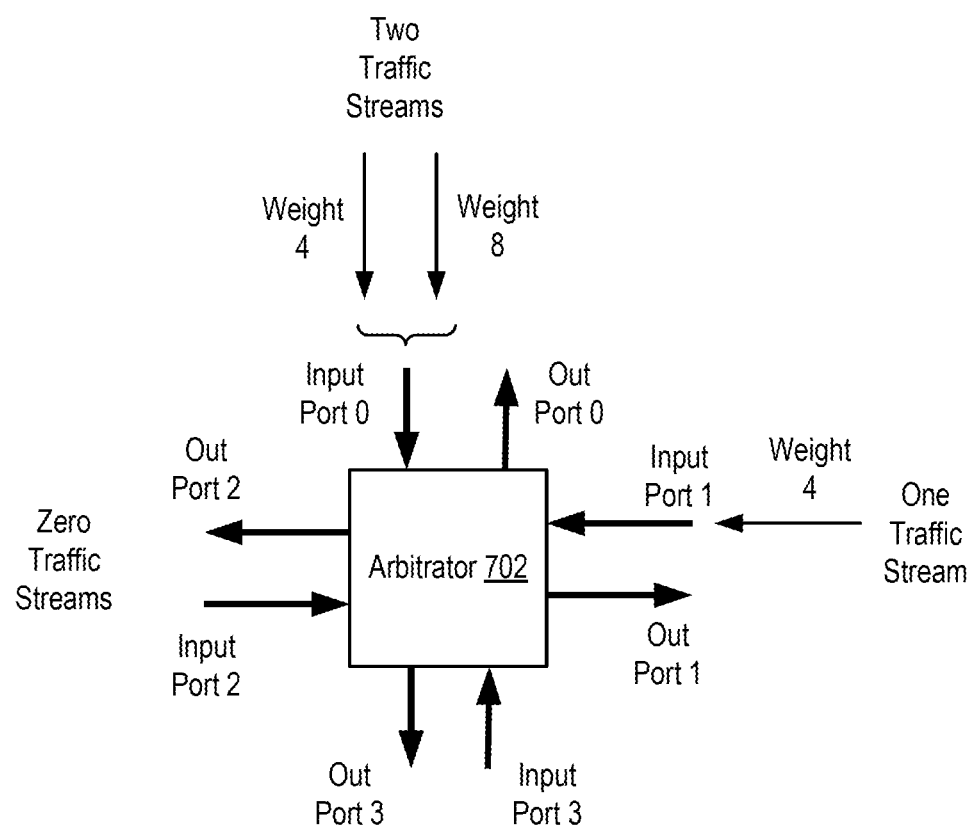
FIG. 7 is a block diagram depicting arbitration in a switch of a NoC according to an example.

FIG. 7 is a block diagram depicting arbitration in a switch 206 of the NoC 106 according to an example. Each switch 206 includes an arbitrator 702. In the example, the arbitrator 702 includes three input ports designated input port 0, input port 1, and input port 2. But a switch 206 and arbitrator 702 can include any number of input ports. The arbitrator 702 includes an output port designated "out."

As shown in FIG. 7, the input port 2 has no input traffic streams in the example. The input port 0 has two virtual channels receiving two traffic streams (e.g., one low-latency traffic stream and one isochronous traffic stream). The input port 1 has a single virtual channel carrying one traffic stream (e.g., best-effort traffic). Each input port of the arbitrator 702 has an assigned weight. The weight controls the relative share of arbitration bandwidth assigned to each traffic flow. In the example, port 0 has an arbitration weights of 4 and 8 for the respective virtual channels, and port 1 has an arbitration weight of 4 on the single virtual channel. This means that, of the available bandwidth at the output port, the first traffic stream at port 0 gets 25% of the bandwidth, the second traffic stream at port 0 gets 50% of the bandwidth, and the traffic stream at port 1 gets 25% of the bandwidth. For example, the low-latency traffic at port 0 can be assigned more bandwidth (due to higher priority) than the best-effort traffic (lower priority). This means that if all requestors are sending, the arbitrator 702 will service the low-latency traffic as long as it has arbitration tokens. The best-effort traffic will get services if it has a token and there are no other higher-priority requesters that also have a token. If there are requestors present and no requestor has an arbitration token left, the arbitration tokens are reloaded according to the specified weights. The arbitrator 702 also reloads the arbitration tokens if all requestors run out of tokens.

The description above is for one arbitration point. The programming of each arbitration point on a given physical path ensures that there is enough bandwidth end-to-end. The use of a high-priority assignment to some virtual channels ensures that the transactions receive lower latency/lower jitter service. The use of arbitration weights and deficit arbitration ensures that all requestors receive some amount of bandwidth according to its arbitration weights within a period of time corresponding to the sum of all the arbitration weights. The time to service of such a group may be less if some requestors are not sending traffic.

Figure 8:
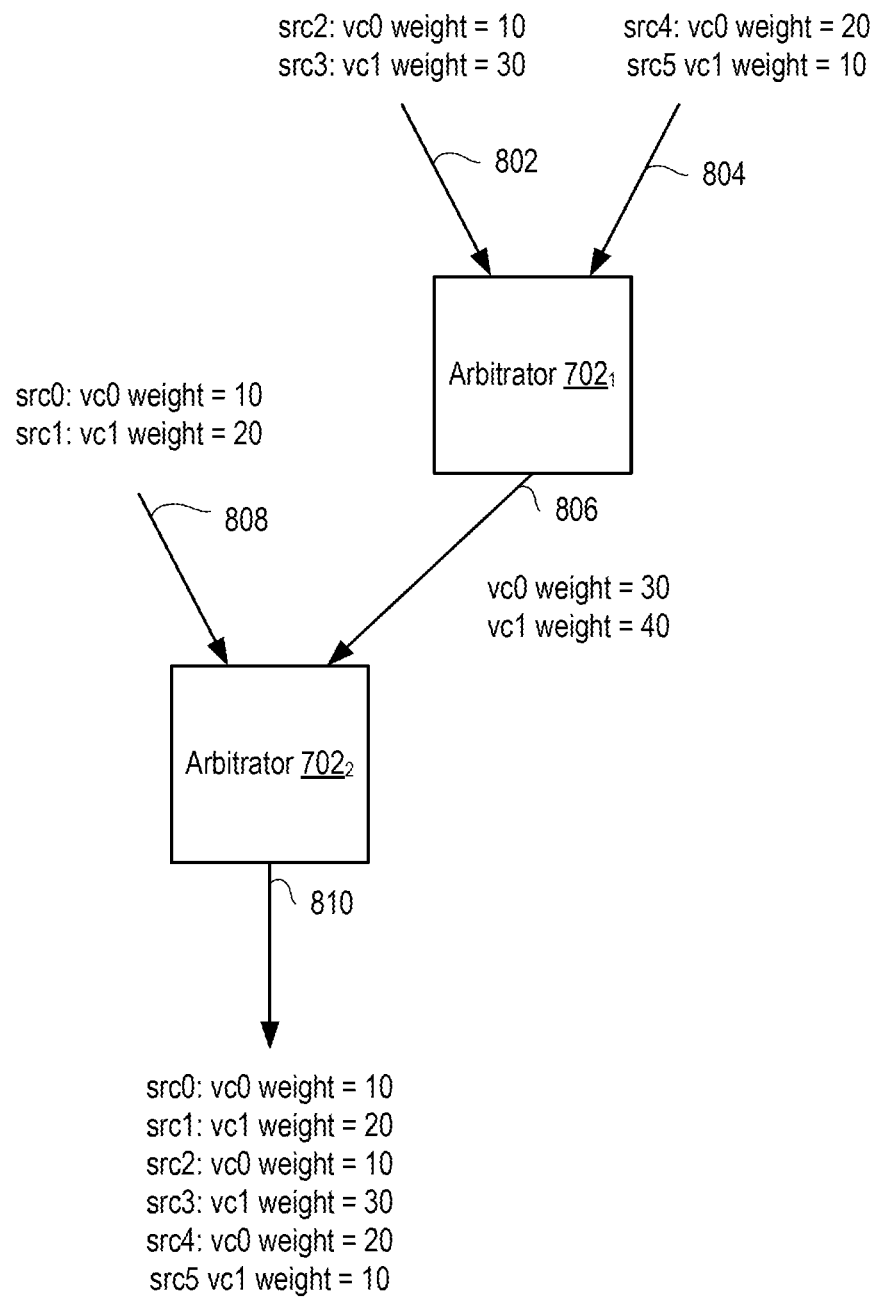
FIG. 8 is a block diagram depicting assignment of weights to virtual channels according to an example.

FIG. 8 is a block diagram depicting assignment of weights to virtual channels according to an example. The example includes two arbitrators $702_1$ and $702_2$. The arbitrator $702_1$ arbitrates among physical channels 802, 804, and 806. The arbitrator $702_2$ arbitrates among physical channels 806, 808, and 810. Each physical channel 802, 804, 806, and 808 includes two virtual channels, designated vc0 and vc1. In the example, there are six different sources (e.g., master devices) designated src0 . . . src5. The source src0 is on vc0 of physical channel 808. The source src1 is on vc1 of physical channel 808. The source src2 is on vc0 of the physical channel 802. The source src3 is on vc1 of the physical channel 802. The source src4 is on vc0 of the physical channel 804. The source src5 is on vc1 of the physical channel 804. The arbitrator $702_2$ is programmed to provide a weight of 10 on vc0 of the physical channel 808 and a weight of 20 on vc1 of the physical channel 808. The arbitrator $702_2$ is programmed to provide a weight of 30 on vc0 of the physical channel 806 and a weight of 40 on vc1 of the physical channel 806. The arbitrator $702_1$ is programmed to provide a weight of 10 on vc0 of the physical channel 802 and a weight of 30 on vc1 of the physical channel 802. The arbitrator $702_1$ is programmed to provide a weight of 20 on vc0 of the physical channel 804 and a weight of 10 on vc1 of the physical channel 804. This weighting scheme results in src0 having a weight 10, src1 having a weight 20, src2 having a weight 10, src3 having a weight 30, src4 having a weight 20, and src5 having a weight 10, at the output of the arbitrator $702_2$. Each source gets bandwidth in proportion to its weight. Those skilled in the art will appreciate that various other weighting schemes can be employed across any number of arbitrators for any number of sources in a similar manner.

Figure 9:
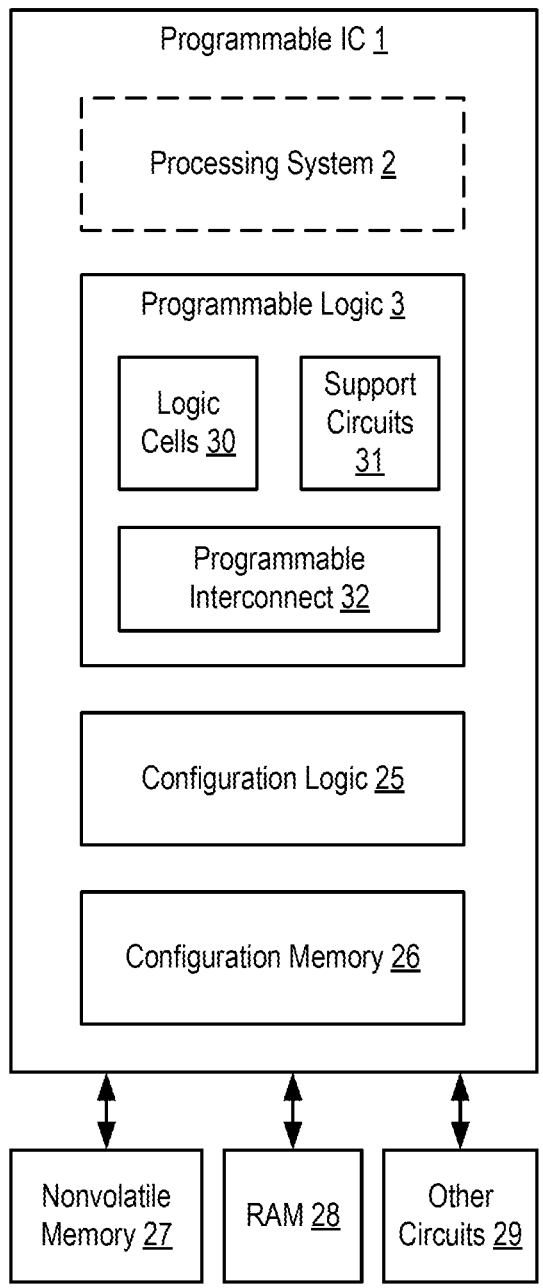
FIG. 9 is a block diagram depicting a programmable integrated circuit (IC) in which techniques described herein can be employed.

FIG. 9 is a block diagram depicting a programmable IC 1 according to an example in which the transmitter 112 described herein can be used. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 10:
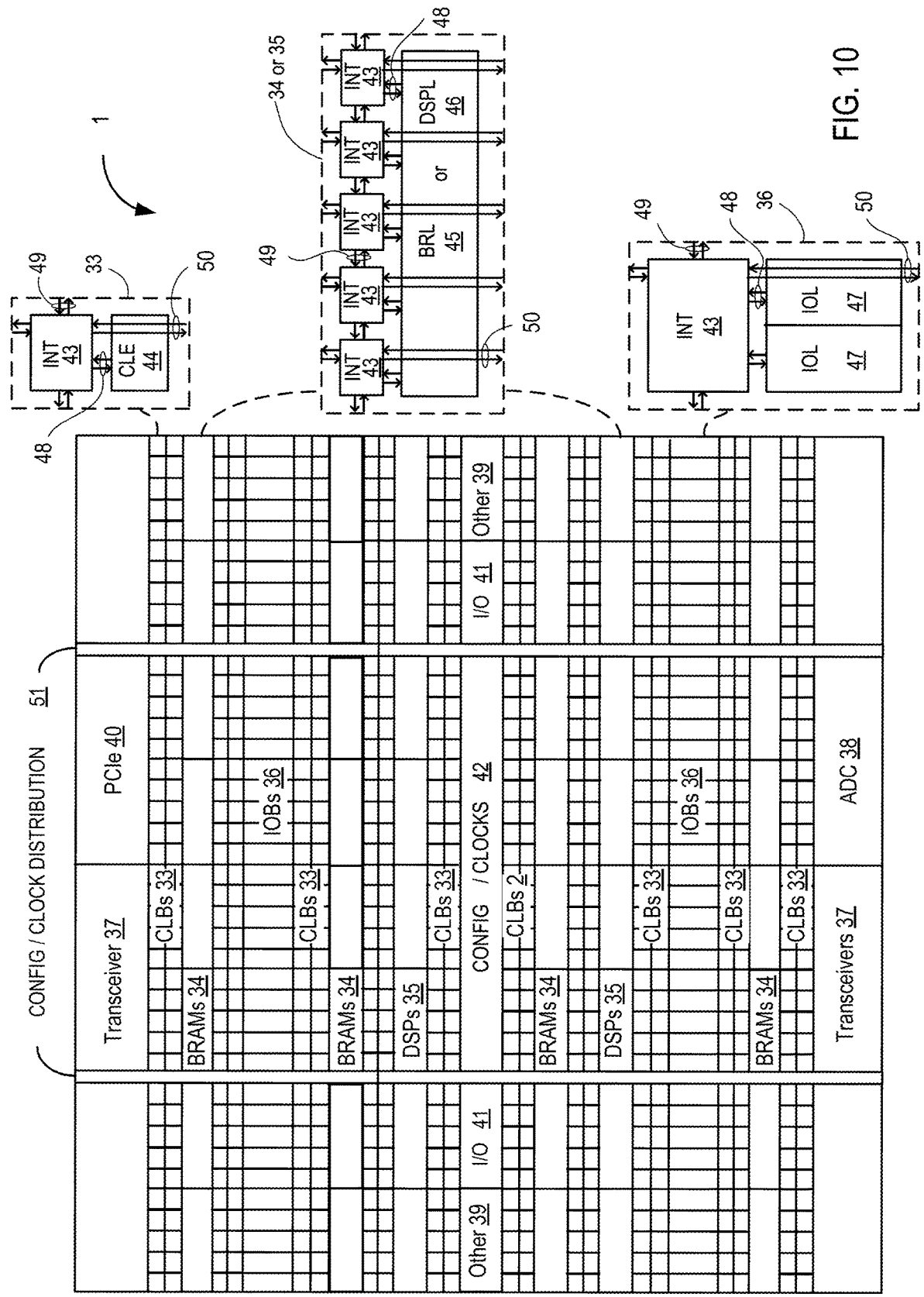
FIG. 10 is a schematic diagram of a field programmable gate array (FPGA) architecture in which techniques described herein can be employed.

FIG. 10 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 10. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 10) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method of generating a configuration for a network on chip (NoC) in a programmable device, comprising:
   receiving traffic flow requirements for a plurality of traffic flows;

assigning routes through the NoC for each traffic flow based on the traffic flow requirements;
determining arbitration settings for the traffic flows along the assigned routes;
generating programming data for the NoC; and
loading the programming data to the programmable device, the programmable device including the NoC, loading the programming data to the programmable device includes configuring the NoC.

2. The method of claim 1, wherein the step of receiving the traffic flow requirements comprises:
receiving source and destination information for each of the plurality of traffic flows.

3. The method of claim 2, wherein the step of receiving the traffic flow requirements further comprises:
receiving class information for each of the plurality of traffic flows, where the class information includes assignment of one of a plurality of traffic classes to each of the plurality of traffic flows.

4. The method of claim 3, wherein the step of assigning the routes comprises:
selecting a physical channel for each of the plurality of traffic flows based on assigned source and destination; and
selecting a virtual channel for each of the plurality of traffic flows based on assigned traffic class.

5. The method of claim 3, wherein the source and destination information includes a master circuit and a slave circuit for each of the plurality of traffic flows.

6. The method of claim 3, wherein each of the routes is between a master circuit and a slave circuit having one or more switches therebetween.

7. The method of claim 6, wherein each of the one or more switches includes an arbitrator, and wherein the step of determining the arbitration settings comprises assigning weights to one or more virtual channels input to the arbitrator in each of the one or more switches.

8. A non-transitory computer readable medium having stored thereon instructions executable by a processor to perform a method of generating a configuration for a network on chip (NoC) in a programmable device, comprising:
receiving traffic flow requirements for a plurality of traffic flows;
assigning routes through the NoC for each traffic flow based on the traffic flow requirements;
determining arbitration settings for the traffic flows along the assigned routes;
generating programming data for the NoC; and
loading the programming data to the programmable device, the programmable device including the NoC, wherein the loaded programming data configures the NoC.

9. The non-transitory computer readable medium of claim 8, wherein the step of receiving the traffic flow requirements comprises:
receiving source and destination information for each of the plurality of traffic flows.

10. The non-transitory computer readable medium of claim 9, wherein the step of receiving the traffic flow requirements further comprises:
receiving class information for each of the plurality of traffic flows, where the class information includes assignment of one of a plurality of traffic classes to each of the plurality of traffic flows.

11. The non-transitory computer readable medium of claim 10, wherein the step of assigning the routes comprises:
selecting a physical channel for each of the plurality of traffic flows based on assigned source and destination; and
selecting a virtual channel for each of the plurality of traffic flows based on assigned traffic class.

12. The non-transitory computer readable medium of claim 10, wherein the source and destination information includes a master circuit and a slave circuit for each of the plurality of traffic flows.

13. The non-transitory computer readable medium of claim 10, wherein each of the routes is between a master circuit and a slave circuit having one or more switches therebetween.

14. The non-transitory computer readable medium of claim 13, wherein each of the one or more switches includes an arbitrator, and wherein the step of determining the arbitration settings comprises assigning weights to one or more virtual channels input to the arbitrator in each of the one or more switches.

15. A method of implementing a configuration for a network on chip (NoC) in a programmable device, the method comprising:
assigning routes through the NoC for each traffic flow of a plurality of traffic flows based on traffic flow requirements;
determining arbitration settings for the traffic flows along the assigned routes;
generating programming data for the NoC based on the routes and the arbitration settings; and
loading the programming data to the programmable device, the programmable device being configured to store the programming data to configuration registers of components of the NoC, the NoC being configurable based on data stored in the configuration registers of the components of the NoC.

16. The method of claim 15, wherein the traffic flow requirements comprises:
source and destination information for each of the plurality of traffic flows; and
class information for each of the plurality of traffic flows, wherein the class information includes assignment of one of a plurality of traffic classes to each of the plurality of traffic flows.

17. The method of claim 16, wherein assigning the routes comprises:
selecting a physical channel for each of the plurality of traffic flows based on assigned source and destination; and
selecting a virtual channel for each of the plurality of traffic flows based on assigned traffic class.

18. The method of claim 16, wherein the source and destination information includes a master circuit and a slave circuit for each of the plurality of traffic flows.

19. The method of claim 16, wherein each of the routes is between a master circuit and a slave circuit having one or more switches therebetween.

20. The method of claim 19, wherein each of the one or more switches includes an arbitrator, and wherein the step of determining the arbitration settings comprises assigning weights to one or more virtual channels input to the arbitrator in each of the one or more switches.

* * * * *